US009732846B2

(12) United States Patent
Li et al.

(10) Patent No.: US 9,732,846 B2
(45) Date of Patent: Aug. 15, 2017

(54) HYDRAULIC PUMP FAILURE DETECTION FOR TRANSMISSION WITH NORMALLY ENGAGED CLUTCH

(71) Applicant: GM GLOBAL TECHNOLOGY OPERATIONS LLC, Detroit, MI (US)

(72) Inventors: Dongxu Li, Troy, MI (US); Chunhao J. Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 14/508,129

(22) Filed: Oct. 7, 2014

(65) Prior Publication Data

US 2016/0096518 A1    Apr. 7, 2016

(51) Int. Cl.
| | |
|---|---|
| F16H 61/12 | (2010.01) |
| B60W 10/02 | (2006.01) |
| F02D 29/00 | (2006.01) |
| F16H 59/68 | (2006.01) |
| F16H 59/72 | (2006.01) |
| F16H 63/50 | (2006.01) |
| F16H 59/38 | (2006.01) |

(52) U.S. Cl.
CPC ............ *F16H 61/12* (2013.01); *F16H 63/50* (2013.01); *F16H 2059/385* (2013.01); *F16H 2061/1208* (2013.01); *F16H 2061/1256* (2013.01)

(58) Field of Classification Search
CPC ... B60W 10/06; B60W 10/02; F02N 11/0844; F16H 61/12; F16H 61/143; F16H 59/68; F16H 59/72
See application file for complete search history.

(56) References Cited

U.S. PATENT DOCUMENTS

| 8,210,979 B2 | 7/2012 | Jones et al. | |
|---|---|---|---|
| 2007/0093357 A1* | 4/2007 | Sugimura | ............... F16H 59/68 477/97 |
| 2008/0077297 A1* | 3/2008 | Ito | ........................... F16H 59/72 701/48 |
| 2009/0240405 A1* | 9/2009 | Tawara | ................. B60W 10/02 701/52 |

(Continued)

FOREIGN PATENT DOCUMENTS

| JP | 07293290 A | * | 11/1995 |
|---|---|---|---|
| JP | 2013252734 A | * | 12/2013 |

*Primary Examiner* — Yuri Kan
(74) *Attorney, Agent, or Firm* — Quinn IP Law (57) ABSTRACT

A method of detecting a failure of a hydraulic pump includes sensing a rotational speed of the engine, and a rotational speed of a rotating drivetrain component. A numerical difference between the rotational speed of the engine and the rotational speed of the rotating drivetrain component is calculated. The numerical difference is compared to a threshold value to determine if the numerical difference is less than the threshold value, or is equal to or greater than the threshold value. A failure of the hydraulic pump is identified when the numerical difference between the rotational speed of the engine and the rotational speed of the rotating drivetrain component is equal to or greater than the threshold value, and the transmission is positioned in the neutral gear mode. When a failure of the hydraulic pump is identified, the operation of the engine is stopped.

16 Claims, 4 Drawing Sheets

(56) References Cited

U.S. PATENT DOCUMENTS

| | | | | |
|---|---|---|---|---|
| 2010/0018822 A1* | 1/2010 | Soga | ............... | F16H 61/143 |
| | | | | 192/3.29 |
| 2010/0191407 A1* | 7/2010 | Tanaka | ............... | F16H 61/12 |
| | | | | 701/31.4 |
| 2012/0295759 A1* | 11/2012 | Fujiwara | ............ | F02N 11/0844 |
| | | | | 477/167 |

* cited by examiner

HYDRAULIC PUMP FAILURE DETECTION FOR TRANSMISSION WITH NORMALLY ENGAGED CLUTCH

TECHNICAL FIELD

The disclosure generally relates to a vehicle having an engine with an automatic start/stop capability and a transmission with a normally engaged clutch, and more specifically to a method and apparatus of detecting the failure of a hydraulic pump in the vehicle and controlling the vehicle when failure of the hydraulic pump is detected.

BACKGROUND

Automotive vehicles with automatic transmissions rely on a hydraulic pump to provide fluid pressure to operate clutches internal to the transmission during transmission operation. However, the hydraulic pump does not operate when the vehicle engine is stopped. To enhance fuel economy, some vehicles with automatic transmissions stop the engine when the vehicle comes to a stop. In order to prevent a delay while pressure builds within the fluid lines, the transmission may be equipped with a clutch that is normally engaged, i.e., the clutch is engaged to transfer torque in the absence of fluid pressure from the main hydraulic pump. The normally engaged clutch positions the transmission in a first or low gear in preparation for launch, so that as soon as the engine is restarted from the automatic start/stop, torque may be transferred through the transmission to the wheels without waiting for the fluid pressure to build up within the fluid lines. As soon as pressure within the fluid lines builds, the normally engaged clutch may be controlled as usual to either maintain torque communication, or disengage the clutch.

Because the normally engaged clutch transfers torque through the transmission, even in the absence of fluid pressure from the main hydraulic pump, and because the normally engaged clutch requires a fluid pressure from the hydraulic pump to disengage and prevent torque transfer through the transmission, it is necessary to identify a failure in the main hydraulic pump and control the vehicle appropriately in the event that the hydraulic pump fails.

SUMMARY

A method of operating a vehicle having an engine with an automatic start/stop capability, and a transmission with a normally engaged clutch is provided. The method includes sensing a rotational speed of the engine, and sensing a rotational speed of a rotating drivetrain component disposed downstream of a pump of a torque converter of the transmission, and not directly connected to an output of the transmission. A numerical difference between the rotational speed of the engine and the rotational speed of the rotating drivetrain component is compared to a threshold value to determine if the numerical difference is less than the threshold value, or if the numerical difference is equal to or greater than the threshold value. Operation of the engine is stopped when the transmission is in a neutral gear mode and the numerical difference is equal to or greater than the threshold value.

A method of detecting a failure of a hydraulic pump in a vehicle having an engine with an automatic start/stop capability, and a transmission with a normally engaged clutch is provided. The method includes sensing a rotational speed of the engine, and sensing a rotational speed of a rotating drivetrain component disposed downstream of a pump of a torque converter of the transmission, and not directly connected to an output of the transmission. A numerical difference between the rotational speed of the engine and the rotational speed of the rotating drivetrain component is calculated. The numerical difference between the rotational speed of the engine and the rotational speed of the rotating drivetrain component is compared to a threshold value to determine if the numerical difference is less than the threshold value, or if the numerical difference is equal to or greater than the threshold value. An operating mode of the transmission is identified to determine if the transmission is positioned in a neutral gear mode, or if the transmission is positioned in a non-neutral gear mode. A failure of the hydraulic pump is identified when the numerical difference between the rotational speed of the engine and the rotational speed of the rotating drivetrain component is equal to or greater than the threshold value, and the transmission is positioned in the neutral gear mode.

A vehicle is also provided. The vehicle includes an engine having an automatic start/stop capability, and a transmission coupled to the engine. The transmission includes a torque converter having a pump and a stator, and a normally engaged clutch operable to transfer torque in the absence of applied fluid pressure. A hydraulic pump powered by the engine and coupled to the transmission to circulate a fluid through the transmission and to the normally engaged clutch when the engine is operating. A transmission control module is operably connected to the transmission. The transmission control module is operable to receive a signal indicating the rotational speed of the engine, and receive a signal indicating the rotational speed of a rotating drivetrain component disposed downstream of the pump of the torque converter, and not directly connected to an output of the transmission. The transmission control module calculates a numerical difference between the rotational speed of the engine and the rotational speed of the rotating drivetrain component from the signals indicating the rotational speed of the engine and the rotational speed of the rotating drivetrain component respectively. The transmission control module then compares the numerical difference to a threshold value to determine if the numerical difference is less than the threshold value, or if the numerical difference is equal to or greater than the threshold value. The transmission control module is capable of identifying an operating mode of the transmission to determine if the transmission is disposed in a neutral gear mode, or in one of a plurality of non-neutral gear modes. When the numerical difference is equal to or greater than the threshold value, and the transmission is positioned in the neutral gear mode, the transmission control module identifies a failure of the hydraulic pump, and stops operation of the engine.

Accordingly, the method is applied to control the vehicle based on the knowledge that when the normally engaged clutch is engaged, the normally engaged clutch will drag down or slow the rotational speed of the rotating drivetrain component relative to the rotational speed of the engine when the hydraulic pump fails with the transmission being in a neutral gear mode and the vehicle being stationary. Therefore, a large or significant numerical difference between the rotational speed of the engine and the rotational speed of the rotating drivetrain component indicates that the normally engaged clutch is currently engaged. When the neutral mode of the transmission is selected, and the engine is running, the fluid pressure from the hydraulic pump should disengage the normally engaged clutch to disconnect torque transfer through the transmission. However, if the hydraulic pump has failed or is otherwise incapable of providing fluid pressure to the normally engaged clutch to disengage the normally engaged clutch, then the normally engaged clutch remains engaged, even when the neutral mode is selected. As such, when the numerical difference between the rotational speed of the engine and the rotational speed of the rotating drivetrain component is equal to or greater than the threshold value, and the transmission is positioned in the neutral mode, the transmission control module may determine that the normally engaged clutch is still engaged because the hydraulic pump has failed or is otherwise not providing fluid pressure to the normally engaged clutch. In such a situation, the transmission control module may stop operation of the engine to prevent unintended movement of the vehicle.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
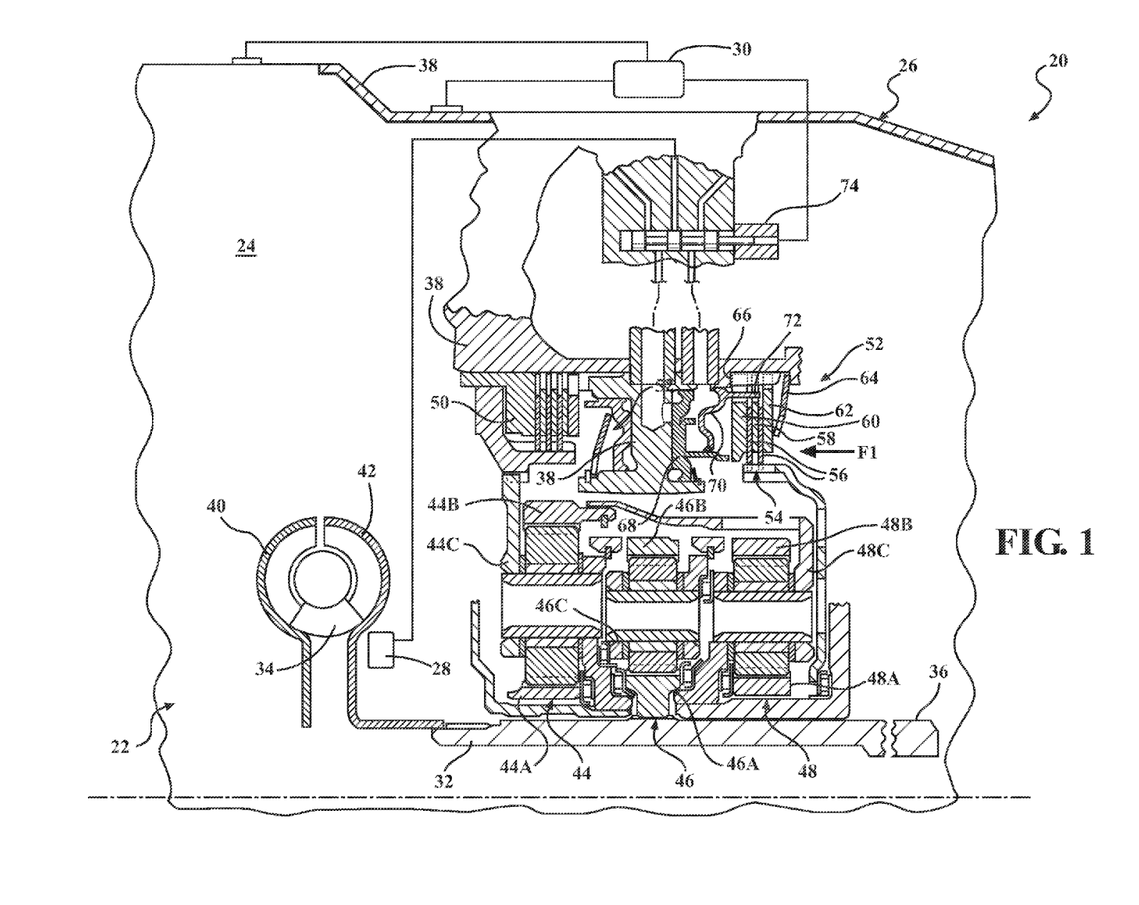
FIG. 1 is a schematic partial cross sectional view of a powertrain of a vehicle showing a normally engaged clutch of a transmission in a non-hydraulically actuated, engaged position.

Referring to the drawings, wherein like reference numbers refer to like components, a vehicle is generally shown at 20 in FIG. 1. The vehicle 20 includes a powertrain 22 having an engine 24 and a transmission 26 coupled to the engine 24 for transmitting engine torque to driven wheels (not shown) of the vehicle 20. As provided, the vehicle 20 includes an automatic start/stop function or capability, which may automatically shut down and restart the engine 24 to reduce the amount of time the engine 24 spends idling, thereby improving fuel economy. Engine start/stop capability is advantageous for vehicles 20 which spend significant amounts of time waiting at traffic lights, or frequently come to a stop in traffic jams. Such a start/stop feature is often present in hybrid electric vehicles 20, typically employing an electric motor/generator (not shown) in addition to the engine 24 for propelling the vehicle 20, but may also be employed in vehicles which lack a hybrid electric powertrain 22, and instead use only the internal combustion engine 24 for propulsive power.

This disclosure teaches of a method identifying a failure of a hydraulic pump 28 for the transmission 26 of the vehicle 20, and a method of controlling the vehicle 20 when such a failure is identified. The method is applicable to vehicles 20 having an engine 24 configured for the start/stop function described above, and which use a clutch biased into a normally engaged state to position the transmission 26 in a first or low gear in preparation for launch when the engine 24 is stopped, without the use of an auxiliary pump or an accumulator for providing fluid pressure to the transmission 26 when the engine 24 is stopped and the hydraulic pump 28 is not running. As used herein, the term "normally engaged" is defined as a default or natural position, i.e., a normal position. Accordingly, a clutch that is normally engaged is a clutch whose default position is an engaged state capable of transmitting torque when active control of the clutch is not applied, e.g., a pressurized fluid control signal. The powertrain 22 described below is an exemplary embodiment of a powertrain 22 suitable for use in accordance with the methods described herein. However, it should be appreciated that the powertrain 22, and specifically the transmission 26, may be configured differently than shown in the exemplary embodiment and described herein.

The engine 24 is operatively connected to the transmission 26, which is configured for receiving power and torque from the engine 24. The vehicle 20 additionally includes a controller 30 operably connected to the transmission 26 and adapted for controlling operation of the transmission 26. The controller 30 may include a control module, such as but not limited to a transmission control module, or a powertrain 22 control module, to control the operation of the transmission 26 and/or engine 24 The controller 30 may include a computer and/or processor, and include all software, hardware, memory, algorithms, connections, sensors, etc., necessary to manage and control the operation of the transmission 26 and/or the engine 24 As such, a method, described below and generally shown in FIG. 4 at 100, may be embodied as a program operable on the controller 30. It should be appreciated that the controller 30 may include any device capable of analyzing data from various sensors, comparing data, making the necessary decisions required to control the operation of the transmission 26 and/or engine 24 and executing the required tasks necessary to control the operation of the transmission 26 and/or engine 24, as well as execute the steps of the method described below.

The transmission 26 includes an input member, shown as an input shaft 32 operatively connected to the engine 24 via a torque converter 34, an output member, shown as an output shaft 36, and a stationary member, shown as a transmission housing 38. Engine 24 torque is transferred between the input shaft 32 and the output shaft 36 via a planetary gearing arrangement, as known by those skilled in the art. The torque converter 34 includes a pump 40 and a stator 42, which operate as known to those skilled in the art.

Figure 2:
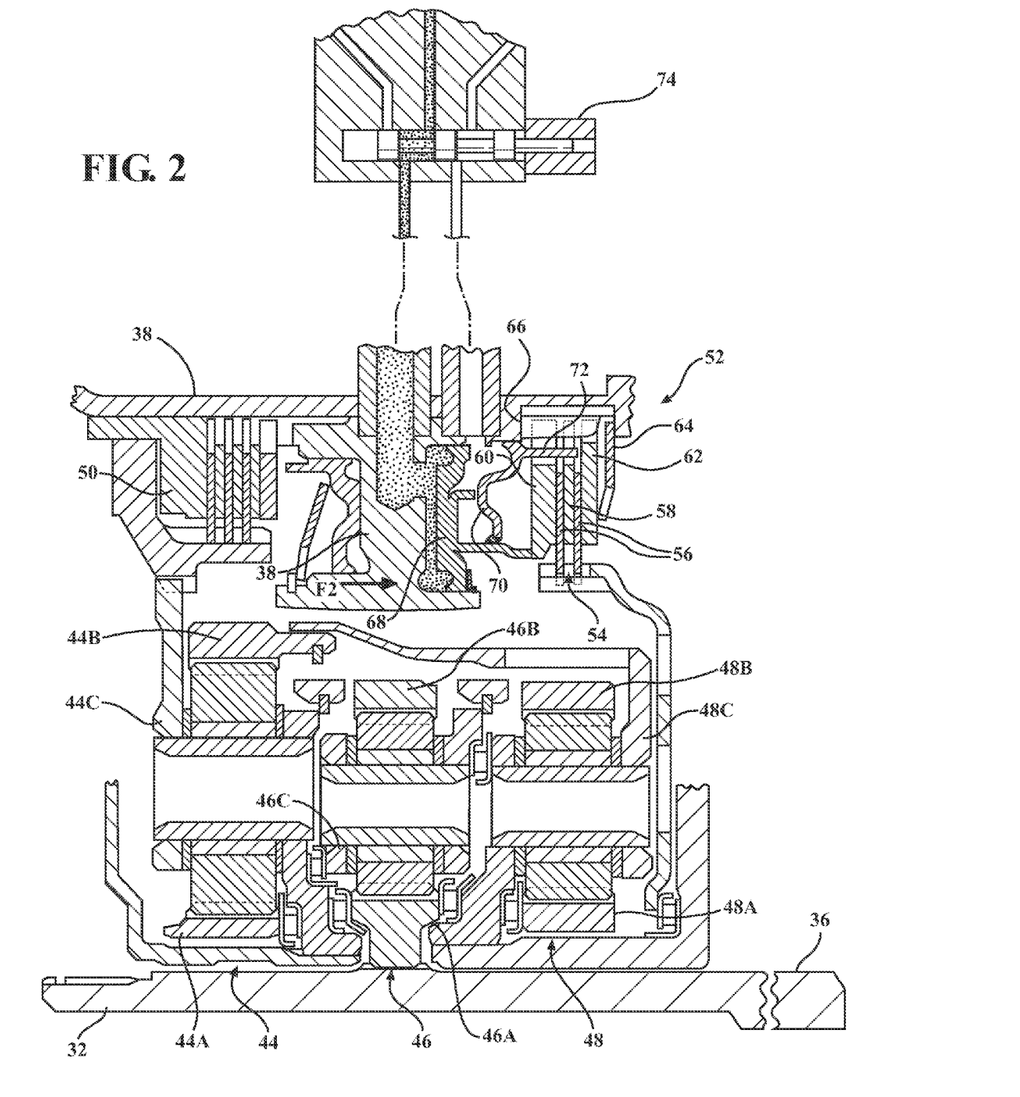
FIG. 2 is a schematic partial cross sectional view of the transmission showing the normally engaged clutch in a hydraulically actuated, engaged position.
Figure 3:
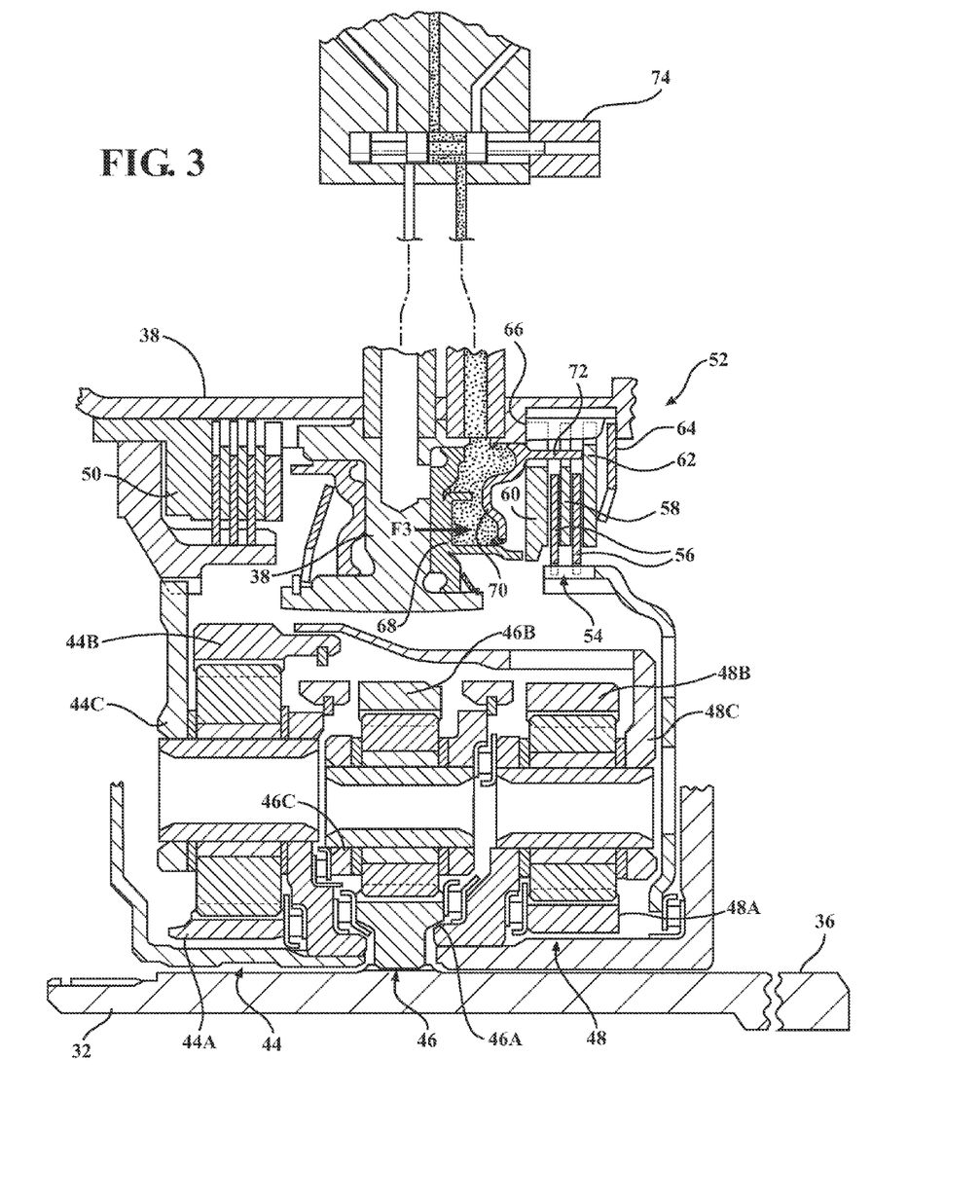
FIG. 3 is a schematic partial cross sectional view of the transmission showing the normally engaged clutch in a hydraulically actuated, disengaged position.

In FIGS. 1-3, the planetary gearing arrangement is shown to include three planetary gear sets, 44, 46, and 48. Each planetary gear set includes a sun gear, 44A, 46A, 48A, a ring gear, 44B, 46B, 48B, and a carrier member 44C, 46C, 48C, respectively. Various interconnections between the planetary gear sets 44, 46, and 48 via their respective sun gears 44A, 46A, 48A, ring gears 44B, 46B, 48B, and carrier members 44C, 46C, 48C, are possible, as known by those skilled in the art, in order to achieve the desired transmission gear ratios between the input shaft 32 and the output shaft 36. The transmission 26 also includes the hydraulic pump 28, which is coupled to the engine 24 and adapted to circulate a pressurized fluid to various components of the transmission 26, such as a first clutch 50 and a normally engaged clutch 52. The hydraulic pump 28 may be referred to as a transmission fluid pump. Additionally, it should be appreciated that the normally engaged clutch 52 is a clutch whose default position is an engaged state capable of transmitting torque when active control of the clutch is not applied, e.g., a pressurized fluid control signal from the hydraulic pump 28.

The normally engaged clutch 52 transmits torque when in the engaged state, such as shown in FIGS. 1 and 2, and does not transmit torque when in the disengaged state, such as shown in FIG. 3. The normally engaged clutch 52 may be employed to transmit torque between the engine 24 and the output shaft 36 in a low or first gear ratio typically employed for launching the vehicle 20. Additionally, the normally engaged clutch 52 may be configured to transmit torque between any one of gear members 44A-C, 46A-C, and 48A-C and any other of the gear members of the planetary gearing arrangement, as well as between one of the gear members and the transmission housing 38, or between the engine 24 and the transmission 26.

The normally engaged clutch 52 includes a friction-element, shown as a clutch pack 54. The clutch pack 54 includes interspaced sets of friction plates 56 and at least one reaction plate 58 placed in contact with one another when the normally engaged clutch 52 is engaged, as known by those skilled in the art. The normally engaged clutch 52 also includes a first plate 60, or apply plate, which functions as an apply member or a plate that is configured for pressing against the clutch pack 54 on a first side. Additionally, the normally engaged clutch 52 includes a second plate 62, which functions as a backing member or a plate that is configured for pressing against the clutch pack 54 on a second side, opposite the first, or apply plate. The normally engaged clutch 52 is operable to transfer torque therethrough in the absence of a control signal, such as but not limited to a fluid pressure. In order to transmit torque in the absence of a control signal, the normally engaged clutch 52 includes a Belleville spring 64, which is a mechanical biasing device configured to apply a first force F1 to the second plate 62, to thereby clamp the clutch pack 54 between the first plate 60 and the second plate 62 to engage the clutch (shown in FIG. 1). The housing 38 includes a specially formed or machined shoulder 66 for the first plate 60 to contact and seat against. The shoulder 66 provides a reaction surface for the first plate 60, when the first plate 60 shifts in response to the first force F1.

While the exemplary embodiment of the transmission 26 is shown using the Bellville spring to bias the clutch pack 54 into the engaged state in the absence of a fluid pressure from the hydraulic pump 28, it should be appreciated that the transmission 26 may be configured in some other manner with some other device capable of biasing the clutch pack 54 into the engaged state, such as but not limited to a hydraulic pressure or pneumatic pressure. The mechanically-biased, normally engaged clutch 52 facilitates engine 24 stop/start function without the use of any auxiliary electric pump or accumulator.

The normally engaged clutch 52 also employs an apply piston 68 adapted to apply a second force F2 to the first plate 60 (shown in FIG. 2), and a release piston 70 adapted to apply a third force F3 to the second plate 62 (shown in FIG. 3). The apply piston 68 is retained on its inner and outer diameters by the housing 38. When the apply piston 68 is fully retracted, the apply piston 68 seats against a reaction surface of the housing 38. There is sufficient clearance between the apply piston 68, when in its fully retracted state, and the first plate 60 to permit the clutch pack 54 to be clamped when the first force F1 is applied, and the first plate 60 contacts and seats against the shoulder 66. When the release piston 70 is fully retracted, the release piston 70 can rest against the apply piston 68.

The release piston 70 is retained at its outer diameter by the housing 38, and at its inner diameter by a ring formed on the surface of the apply piston 68. The release piston 70 includes a set of fingers 72 that protrude through openings in the first plate 60, and through openings in the reaction plates 58, thereby permitting the release piston 70 to make contact with and transmit the third force F3, as shown in FIG. 3, to the second plate 62. There is sufficient clearance between the fingers 72 and the second plate 62 to permit the clutch pack 54 to be clamped when the first force F1 is applied and the first plate 60 contacts and seats against the shoulder 66. As can be seen from FIGS. 1-3, force F1 is applied in a direction that is opposite to that of forces F2 and F3. The normally engaged clutch 52 is hydraulically engaged when the first plate 60 is pressed against the clutch pack 54 by the second force F2 (as shown in FIG. 2). On the other hand, the normally engaged clutch 52 is hydraulically disengaged when the third force F3 is applied to the second plate 62 in the absence of the second force F2 (as shown in FIG. 3).

In the as-assembled, pre-compressed state, The Belleville spring 64 applies the first force F1 to the second plate 62 to clamp the clutch pack 54 between the first plate 60 and the second plate 62, and, therefore, keeps the normally engaged clutch 52 engaged. During application of the first force F1, the first plate 60 contacts and seats against the shoulder 66, thereby permitting the normally engaged clutch 52 to be engaged. As such, the normally engaged clutch 52 is kept engaged by the Belleville spring 64 without application of power, be that hydraulic, pneumatic or electrical power. The engagement of the normally engaged clutch 52 provided solely by the first force F1 from the Belleville spring 64 is typically sufficient to keep the transmission 26 in gear when the engine 24 is off. Additionally, the first force F1 is also sufficient to transmit relatively low torque-output of engine 24 that is generally seen during engine 24 start-up and at lower engine 24 speeds. The application of the third force F3 by the release piston 70, as described above, compresses the Belleville spring 64 beyond its as-assembled, pre-compressed state and acts to retain such additional compression. In the instance that the second force F2 is not applied, such additional compression of the Belleville spring 64 permits the friction plates 56 and the reaction plate(s) 58 of the clutch pack 54 to separate from each other and also from backing plate, to thereby disengage the normally engaged clutch 52.

The controller 30, described above, controls operation of a valve 74 located remotely from the normally engaged clutch 52. The valve 74 is configured to regulate the flow of hydraulic fluid received from the hydraulic pump 28, and pressurize either the release piston 70, and selectively pressurize the apply piston 68. The fluid pressure is employed to selectively actuate the apply piston 68, and continuously pressurize the release piston 70, depending on whether the normally engaged clutch 52 is desired to be engaged or disengaged, respectively. It should be appreciated that the valve 74 only regulates the flow of hydraulic fluid when the engine 24 is running and the hydraulic pump 28 is operating properly to supply the valve 74 with pressurized fluid.

Figure 4:
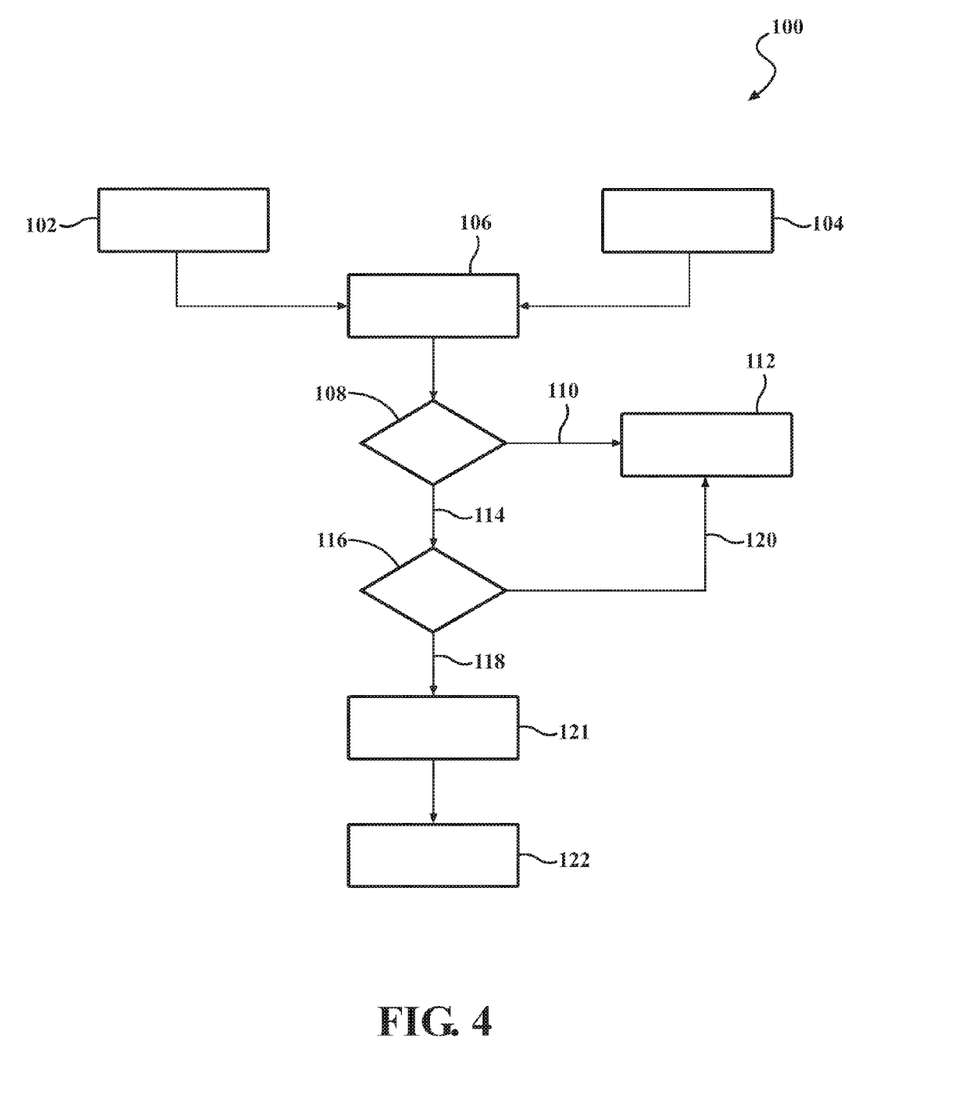
FIG. 4 is a flow chart representing a method of controlling a vehicle in accordance with the present disclosure.

The method of operating the vehicle 20 is generally shown at 100 in FIG. 4. The method of operating the vehicle 20 includes a method of identifying a failure of the transmission fluid pump, i.e., the hydraulic pump 28 that circulates the fluid to the transmission 26. The method includes providing the controller 30, such as the transmission control module, which is operable to control the operation of the transmission 26 and/or engine 24. As noted above, the controller 30 includes all software, hardware, memory, algorithms, connections, sensors, etc. necessary to manage and control the operation of the transmission 26 and/or engine 24. The control module is operable to perform the various tasks of the method described below. Notably, the controller 30 is operable to determine if a numerical difference between a rotational speed of the engine 24 and a rotational speed of a rotating drivetrain component is equal to or greater than a threshold value to identify a failure of the hydraulic pump 28, and stopping operation of the engine 24 when the failure of the hydraulic pump 28 is identified and the transmission is in a neutral gear mode.

The method includes sensing a rotational speed of the engine 24, generally indicated by box 102, and sensing a rotational speed of a rotating drivetrain component, generally indicated by box 104. The rotational speed of the engine 24 and the rotational speed of the rotating drivetrain component may be sensed in any suitable manner, such as with one or more speed and/or position sensors. Signals from the various sensors used to sense the rotational speed of the engine 24 and the rotating drivetrain component are sent to the controller 30, e.g., the transmission control module.

As is known, the pump 40 of the torque converter 34 is coupled to the engine 24 for rotation with the engine 24. Accordingly, the pump 40 of the torque converter 34 rotates at the same speed as the engine 24. Accordingly, sensing the rotational speed of the engine 24 may include sensing the rotational speed of the pump 40 of the torque converter 34. Alternatively, sensing the rotational speed of the engine 24 may include sensing or otherwise determining the rotational speed of a crankshaft of the engine 24. For example, the transmission control module may query an engine 24 control module to determine the rotational speed of the engine 24.

The rotating drivetrain component may include any drivetrain component that is disposed downstream of the pump 40 of the torque converter 34, and not directly connected to an output shaft 36 of the transmission 26. As used herein, the term downstream should be interpreted as downstream along a power flow path of the drivetrain. For example, because power flows from the engine 24 to the pump 40 of the torque converter 34, and from the pump 40 to the stator 42 of the torque converter 34, the stator 42 of the torque converter 34 is disposed downstream of the pump 40. Similarly, because the power from the engine 24 flows from the torque converter 34 to drivetrain components of the transmission 26 through the normally engaged clutch 52, the normally engaged clutch 52 and the other drivetrain components of the transmission are disposed downstream of both the pump 40 and the stator 42. The rotating drivetrain component may include, but is not limited to, one of the stator 42 of the torque converter 34, an output shaft 36 of the torque converter 34, a layshaft of the transmission 26, or some other suitable rotating element. Preferably, the rotating drivetrain component is the stator 42 of the torque converter 34.

Once the rotational speed of the engine 24 and the rotational speed of the rotating drivetrain component have been sensed and communicated to the controller 30, the controller 30 may then calculate a numerical difference between the rotational speed of the engine 24 and the rotational speed of the rotating drivetrain component. Calculation of the numerical difference is generally indicated by box 106 of FIG. 4. Due to losses between the pump 40 and the stator 42, the rotational speed of the engine 24 should be slightly greater than the rotational speed of the rotating drivetrain component when the transmission is disposed in the neutral gear mode. Accordingly, calculating the numerical difference may include subtracting the rotational speed of the rotating drivetrain component from the rotational speed of the engine 24.

Once the numerical difference is calculated, the controller 30 may then compare the numerical difference between the rotational speed of the engine 24 and the rotational speed of the rotating drivetrain component to a threshold value to determine if the numerical difference is less than the threshold value, or if the numerical difference is equal to or greater than the threshold value, generally indicated by box 108.

The threshold value is a measure of the difference between the rotational speed of the engine 24 and the rotational speed of the rotating drivetrain component. The threshold value is defined to include a value that is indicative of the rotating drivetrain component being slowed or dragged down by the normally engaged clutch 52.

Accordingly, if the numerical difference is less than the threshold value, generally shown at 110, then the controller 30 may determine that the rotating drivetrain component is not being slowed down by the normally engaged clutch 52, and no action is taken, which is generally indicated by box 112. In contrast, if the numerical difference is equal to or greater than the threshold value, generally indicated at 114, then the controller 30 may determine that the rotating drivetrain component is being slowed by the normally engaged clutch 52.

The threshold value may be defined to any value that is appropriate for the specific drivetrain components, configuration, and/or operating conditions of the vehicle 20. For example, the threshold value may change depending upon a throttle position of the vehicle 20. Accordingly, the method may include sensing a position of the throttle, and adjusting the threshold value accordingly. Engine speed is dynamic and is transient under different throttle conditions. The baseline difference between the rotational speed of the engine and the rotational speed of the rotating drivetrain component varies in normal conditions. The threshold value needs to adjust to the throttle and the engine conditions. The threshold value also needs to adjust to a temperature of the transmission fluid, which determines the transmission drag and parasitic losses as well as the baseline differential speed.

If the controller determines that the numerical difference is equal to or greater than the threshold value, then the controller may continue and identify an operating mode of the transmission 26, generally indicated by box 116. The operating mode of the transmission 26 may include, but is not limited to a neutral gear mode, or one of a plurality of non-neutral gear modes. The controller 30 determines, generally indicated by box 116, if the transmission 26 is currently disposed in the neutral mode, generally indicated at 118 or in a non-neutral mode, generally indicated by 120. If the controller 30 determines that the transmission 26 is disposed in a non-neutral mode, then the controller may take no action, generally indicated by box 112. The non-neutral gear modes may include, but are not limited to, a forward drive mode, a rearward drive mode, or a park mode. It should be appreciated that the neutral mode disengages all gear trains within the transmission 26, effectively disconnecting the transmission 26 from the engine 24 and the driven wheels, allowing the vehicle 20 to coast freely under its own weight and gain momentum without the motive force from the engine 24. The forward drive mode engages one of the forward gear ratios for moving the vehicle 20 in a forward direction. The rearward drive mode engages a rearward gear ratio for moving the vehicle 20 in a rearward direction. The park mode mechanically locks the output shaft 36 of transmission 26, restricting the vehicle 20 from moving in any direction.

As described above, the default position of the normally engaged clutch 52 is the engaged state for transferring torque so that the vehicle 20 is immediately ready to launch as soon as the engine 24 starts. In order for the drive wheels to be disengaged from the engine 24, the hydraulic pump 28 must be operating to supply pressurized fluid to release the normally engaged clutch 52. If the hydraulic pump 28 fails or is otherwise unable to provide the pressurized fluid to the normally engaged clutch 52 to release or disengage the normally engaged clutch 52, then the normally engaged clutch 52 remains engaged, even after the engine 24 starts. Because the normally engaged clutch 52 communicates torque from the engine 24 to the drive wheels in the first gear ratio when engaged, if the hydraulic pump 28 has failed, the vehicle 20 may begin to move even if the transmission 26 is positioned in the neutral drive mode. This is because the normally engaged clutch 52 remains in the engaged state. Accordingly, a failure of the hydraulic pump 28 may cause unintended movement of the vehicle 20 when the transmission 26 is disposed in the neutral gear mode. In order to prevent any unintended movement of the vehicle 20, the controller 30 may identify a failure of the hydraulic pump 28 when the numerical difference between the rotational speed of the engine 24 and the rotational speed of the rotating drivetrain component is equal to or greater than the threshold value, and the transmission 26 is positioned in the neutral gear mode, as is generally indicated by box 121.

Once the controller 30 has identified a failure of the hydraulic pump 28, the controller 30 may then stop operation of the engine 24, generally indicated by box 122. Accordingly, when the numerical difference is equal to or greater than the threshold value, and the transmission 26 is disposed in the neutral gear mode, the controller 30 stops operation of the engine 24, i.e., turns off the engine 24, to prevent torque production, thereby preventing any unintended movement of the vehicle 20. Torque communication through the transmission 26, from the engine 24 to the drive wheels is not instantaneous. It takes time to increase the torque applied to the wheels to a level sufficient to actually overcome the normal load of the vehicle 20 and move the vehicle 20. The controller 30 is operable to identify the failure in the hydraulic pump 28 and stop operation of the engine 24 before torque transfer through the normally engaged clutch 52 is sufficient to move the vehicle 20.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of operating a vehicle having an engine with an automatic start/stop capability and a transmission with a normally engaged clutch, the method comprising:
   sensing a rotational speed of the engine;
   sensing a rotational speed of a rotating drivetrain component disposed downstream of a pump of a torque converter of the transmission, and upstream of the normally engaged clutch;
   comparing a numerical difference between the rotational speed of the engine and the rotational speed of the rotating drivetrain component to a threshold value to determine if the numerical difference is less than the threshold value, or if the numerical difference is equal to or greater than the threshold value; and
   stopping operation of the engine when the numerical difference is equal to or greater than the threshold value.

2. The method set forth in claim 1 further comprising calculating the numerical difference between the rotational speed of the engine and the rotational speed of the rotating drivetrain component.

3. The method set forth in claim 1 wherein the rotating drivetrain component is a stator of the torque converter, and wherein comparing the numerical difference between the rotational speed of the engine and the rotational speed of the rotating drivetrain component to the threshold value is further defined as comparing the numerical difference between the rotational speed of the engine and the rotational speed of the stator of the torque converter to the threshold value.

4. The method set forth in claim 3 wherein the pump of the torque converter is coupled to the engine for rotation with the engine, and wherein sensing the rotational speed of the engine includes sensing a rotational speed of the pump of the torque converter.

5. The method set forth in claim 1 wherein the rotating drivetrain component disposed downstream of the pump of the torque converter and upstream of the normally engaged clutch includes one of a stator of the torque converter, an output shaft of the torque converter, or a layshaft of the transmission.

6. The method set forth in claim 1 wherein stopping operation of the engine when the numerical difference is equal to or greater than the threshold value is further defined as stopping operation of the engine when the numerical difference is equal to or greater than the threshold value and before torque transfer through the normally engaged clutch is sufficient to move the vehicle.

7. The method set forth in claim 1 further comprising identifying an operating mode of the transmission to determine if the transmission is positioned in a neutral gear mode, or if the transmission is positioned in a non-neutral gear mode.

8. The method set forth in claim 7 wherein stopping operation of the engine when the numerical difference is equal to or greater than the threshold value is further defined as stopping operation of the engine when the numerical difference is equal to or greater than the threshold value and when the transmission is disposed in the neutral gear mode.

9. The method set forth in claim 1 further comprising sensing a position of a throttle of the vehicle.

10. The method set forth in claim 1 further comprising providing a vehicle controller operable to determine if the numerical difference between the rotational speed of the engine and the rotational speed of the rotating drivetrain component is equal to or greater than the threshold value, and operable to stop operation of the engine.

11. A method of detecting the failure of a hydraulic pump in a vehicle having an engine with an automatic start/stop capability and a transmission with a normally engaged clutch, the method comprising:
   sensing a rotational speed of the engine;
   sensing a rotational speed of a rotating drivetrain component disposed downstream of a torque converter pump of a torque converter of the transmission, and upstream of the normally engaged clutch;

calculating a numerical difference between the rotational speed of the engine and the rotational speed of the rotating drivetrain component;

comparing the numerical difference between the rotational speed of the engine and the rotational speed of the rotating drivetrain component to a threshold value to determine if the numerical difference is less than the threshold value, or if the numerical difference is equal to or greater than the threshold value;

identifying an operating mode of the transmission to determine if the transmission is positioned in a neutral gear mode, or if the transmission is positioned in a non-neutral gear mode; and identifying a failure of the hydraulic pump when the numerical difference between the rotational speed of the engine and the rotational speed of the rotating drivetrain component is equal to or greater than the threshold value, and the transmission is positioned in the neutral gear mode.

12. The method set forth in claim 11 wherein the pump of the torque converter is coupled to the engine for rotation with the engine, and wherein sensing the rotational speed of the engine includes sensing a rotational speed of the pump of the torque converter.

13. The method set forth in claim 12 wherein the rotating drivetrain component is a stator of the torque converter, and wherein comparing the numerical difference between the rotational speed of the engine and the rotational speed of the rotating drivetrain component to the threshold value is further defined as comparing the numerical difference between the rotational speed of the engine and the rotational speed of the stator of the torque converter to the threshold value.

14. The method set forth in claim 11 further comprising providing a vehicle controller operable to:
receive a signal indicating the rotational speed of the engine;
receive a signal indicating the rotational speed of the rotating drivetrain component;
calculate a numerical difference between the rotational speed of the engine and the rotational speed of the rotating drivetrain component from the signals indicating the rotational speed of the engine and the rotational speed of the rotating drivetrain component respectively;
compare the numerical difference a threshold value to determine if the numerical difference is less than the threshold value, or if the numerical difference is equal to or greater than the threshold value;
determine if the transmission is disposed in the neutral gear mode of in one of the a plurality of non-neutral gear modes; and
identify the failure of the hydraulic pump when the numerical difference is equal to or greater than the threshold value, and the transmission is positioned in the neutral gear mode.

15. A vehicle comprising:
an engine having an automatic start/stop capability;
a transmission coupled to the engine and including a torque converter having a pump and a stator, and a normally engaged clutch operable to transfer torque in the absence of fluid pressure;
a hydraulic pump coupled to the engine and operable to circulate a fluid through the transmission and to the normally engaged clutch when the engine is operating;
a vehicle controller operably connected to the transmission and operable to:
receive a signal indicating the rotational speed of the engine;
receive a signal indicating the rotational speed of a rotating drivetrain component disposed downstream of the pump of the torque converter, and upstream of the normally engaged clutch;
calculate a numerical difference between the rotational speed of the engine and the rotational speed of the rotating drivetrain component from the signals indicating the rotational speed of the engine and the rotational speed of the rotating drivetrain component respectively;
compare the numerical difference to a threshold value to determine if the numerical difference is less than the threshold value, or if the numerical difference is equal to or greater than the threshold value;
identify an operating mode of the transmission to determine if the transmission is disposed in a neutral gear mode of in one of a plurality of non-neutral gear modes;
identify a failure of the hydraulic pump when the numerical difference is equal to or greater than the threshold value, and the transmission is positioned in the neutral gear mode; and
stop operation of the engine when a failure of the hydraulic pump is identified.

16. The vehicle set forth in claim 15 wherein the rotating drivetrain component is the stator of the torque converter.

* * * * *